Patented July 26, 1927.

1,636,854

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

CATALYTIC OXIDATION OF AROMATIC HYDROCARBONS.

No Drawing.  Application filed November 14, 1921. Serial No. 514,903.

This invention relates to improvements in catalysts, particularly to catalysts which are capable of causing oxidation reactions and to processes of oxidation wherein such catalysts are employed. It relates more specifically to the selective oxidation of toluene and also the succeeding members of the benzene series of hydrocarbons, and has particular reference to the production of benzaldehyde and likewise substituted benzaldehydes by vapor phase oxidation of aromatic compounds in the presence of a catalyst.

I am aware that benzaldehyde has been so obtained catalytically, as set forth in U. S. Patent No. 1,284,887, covering the use of oxides of vanadium as the catalyst, and in U. S. Patent No. 1,321,959, specifying the use of an oxide of molybdenum, but the following description of my process will make clear the improvements which I have effected in the catalytic material over the prior art.

I have found that when commercial toluol (toluene $C_7H_8$) is vaporized in any convenient manner and is mixed in suitable proportions with air and finally passed over various oxides of individual metals at elevated temperatures, the catalytic action of the oxides of various metals on toluene is widely different. Among the oxides which I have tried are those of vanadium, molybdenum, uranium, tungsten, chromium, manganese, cobalt, nickel, tin, thorium, zirconium, titanium, copper, cerium, bismuth and tantalum. The following will clearly show the wide variation which exists in the respective activities of the oxides of these various metals when used alone. Vanadium oxide, for example, with a mixture of air and toluene vapor gave benzoic acid, benzaldehyde, maleic acid and a measurable amount of the products of complete combustion, i. e., carbon dioxide and water, these products existing in the proportions of 2.47:1.0:1.45:1.34, while uranium oxide when employed under the same conditions gave a relatively larger benzaldehyde production with a simultaneously extremely large amount of toluene undergoing complete combustion, these being in the ratio of 1:4.11, with a negligible production of maleic acid and benzoic acid. Molybdenum oxide was found to give very much lower benzaldehyde productions than those obtained with vanadium oxide and uranium oxide but with a very small amount of toluene undergoing complete combustion. The relative activities of the remaining oxides investigated, which were all determined under essentially the same running conditions, i. e., catalyst temperature, ratio of air to toluene, and time of contact with the catalyst, can be classified for convenience as follows:

Class I is characterized by relatively high benzaldehyde production and relatively low complete combustion, and includes Ta, W and Zr. Molybdenum would be located in this class.

Class II is characterized by relatively high benzaldehyde production and relatively high complete combustion, and includes Mn, Cu, Ni, Cr and Th. Uranium oxide would find a place in this class.

Class III is characterized by relatively low benzaldehyde production and relatively high complete combustion, and includes Co and Ce.

Class IV is characterized by relatively low benzaldehyde production and relatively low complete combustion, and includes Ti, Bi and Sn.

Thus it is plainly evident that most of these oxides, when used singly, possess certain disadvantages from the standpoint of the commercial production of benzaldehyde from toluene. For example, the majority of the reaction with vanadium oxide is concerned with the production of benzoic acid and maleic acid, while with molybdenum oxide only a relatively small production of benzaldehyde is possible, although it is true that this can be somewhat increased by greatly increasing the catalyst temperature, but such high temperatures are not practicable commercially. In the case of uranium oxide higher benzaldehyde productions are realized than those obtained with either vanadium oxide or molybdenum oxide, but the accompanying complete combustion of the toluene eliminates the possibility of its utilization commercially, as the temperature control of the catalyst during the run has been found to be very difficult. The oxides of the other metals all possess similar disadvantages.

I have discovered, however, that very greatly augmented productions of benzaldehyde with relatively very small complete combustions can be realized under conditions which are highly satisfactory commercially, if mixtures of the various oxides enumerated above are employed in preference to the oxides of the individual metals.

I have found, for example, that small amounts of molybdenum oxide when admixed with uranium oxide almost entirely eliminate the large complete combustion of the toluene which occurs with the latter oxide when used alone, and thus enables the use of much more vigorous oxidizing conditions, thereby causing very large benzaldehyde productions. A small amount of maleic acid was also formed, but I have further found that the addition of a small amount of copper to this molybdenum uranium oxide mixture reduces the production of this material to a negligible quantity without affecting to a material extent the large aldehyde production and low complete combustion.

I have inserted the following table depicting the relative benzaldehyde productions and complete combustions obtained with a few of the catalyst mixtures which I have investigated in an effort to show the vast improvement which I have effected in producing catalysts commercially valuable for the production of benzaldehyde from toluene, and I have included therein the relative results obtained with molybdenum oxide, tantalum oxide, copper oxide and uranium oxide, when used singly, in order to facilitate the comparison, all the catalysts having been investigated under identical running conditions. In the table the percent benzaldehyde production (i. e., pounds of benzaldehyde produced per 100 pounds of toluene passed over the catalyst) and percent complete combustion of the toluene obtained with molybdenum oxide, which were in the ratio of 3 to 2 respectively, are taken as unity for a basis upon which to compare the results obtained when mixed oxide catalysts were used.

| Catalyst | Benzaldehyde production | Complete combustion |
|---|---|---|
| 100% molybdenum oxide | 1.0 | 1.0 |
| 100% tantalum oxide | 1.43 | 0.73 |
| 100% copper oxide | 1.70 | 29.3 |
| 100% uranium oxide | 6.5 | 39.7 |
| 36.4% tantalum oxide / 63.6% uranium oxide | 1.9 | 0.87 |
| 42.7% molybdenum oxide / 57.3% vanadium oxide | 5.6 | 13.0 |
| 21.8% molybdenum oxide / 78.2% uranium oxide | 4.06 | 1.38 |
| 11.5% molybdenum oxide / 88.5% uranium oxide | 6.44 | 1.1 |
| 7.0% molybdenum oxide / 93.0% uranium oxide | 9.6 | 2.8 |
| 7.5% molybdenum oxide / 5.0% copper oxide / 87.5% uranium oxide | 8.8 | 2.9 |
| 7.5% molybdenum oxide / 5.0% vanadium oxide / 87.5% uranium oxide | 5.0 | 2.1 |

The vast improvement in the production of benzaldehyde from toluene by employing mixed catalysts, such as those given in the above table, is quite obvious.

Although several mixed oxide catalysts have thus been given, it is the intention not to be limited to these specific examples, as many other mixtures containing oxides of two or more metals can be prepared. Such mixtures may consist of an oxide or oxides of a metal or metals of the fifth and sixth groups mixed with an oxide or oxides of a metal or metals of another group, or groups, which admixed oxide or oxides in themselves act catalytically to form products of partial oxidation.

It has been impossible to arrive at any definite explanation of the surprising influence which one oxide exerts on another oxide when both are intimately mixed with each other.

In preparing these mixed catalysts, one should exercise great care so that the component oxides in the mixture used in the catalysis should be very finely comminuted and very intimately mixed. The mixed catalysts may be prepared by starting out with a solution of the salts of the metals, which salts on ignition leave only the oxide in the requisite amounts, the oxides of which metals are desired in the finished catalyst. It is also possible to use a water suspension of the oxides or hydroxides, in a very finely divided form, of the various metals. However, I have obtained the best results by starting out with a solution of the salts of the metals made by employing organic acids, as described in my co-pending application, Serial No. 513,111. The carrier, which may consist of pumice, asbestos, etc., may then be added to this prepared solution and the whole evaporated to dryness while being stirred, after which it is ignited in air, or other gases, or in the presence of the air-hydrocarbon mixture used in the catalysis.

It is generally preferable to introduce the catalyst or the carrier containing the same into tubes or containers through which the mixture of toluene vapors and oxygen-containing gas is passed. The tubes or containers holding the catalyst are heated in any convenient manner until the temperature reaches approximately the temperature at which the catalyst is to be used in the catalysis.

While the best results have thus far been obtained by using a mixture of approximately fourteen parts of air to one part of toluene by weight with a catalyst consisting of a mixture of uranium and molybdenum oxides, in which the former predominates, at a temperature slightly higher than 500° C. at approximately atmospheric pressure, considerably higher temperatures, say up to 700° C. or above, and lower temperatures, say down to 300° C. or below, may be used at pressures above and below atmospheric and with different proportions of air or other oxygen-containing gases. By oxygen-containing gases I have reference to air, pure oxygen or ozone, or a mixture of any or all of these or other gases which contain free oxygen, with or without a certain amount of blanketing or diluent gases or steam in order to aid in the control of the rapidity and completeness of the reaction. After the products of reaction have passed out of the reaction zone, the condensable portions of the same may be condensed and separated in the usual manner for the recovery of benzaldehyde, while the uncondensed gases may be permitted to escape. Any unreacted toluene may be again passed through the reaction zone after enriching with oxygen-containing gas, when necessary, before recirculating it through the reaction zone.

Although I have used as an example only the oxidation of toluene to benzaldehyde in disclosing the improvement which I have effected in catalyst composition, it is the intention not to be limited to the oxidation of toluene to its corresponding aldehyde, as my work has shown that the same general results as those obtained with toluene also hold true for the other substituted members of the benzene series of hydrocarbons, such as the xylenes, pseudocumene, mesitylene, etc., and also their various halogenated derivatives, except that the magnitude of the results is somewhat different for each compound in question.

I claim:—

1. The process which comprises passing an aromatic compound, containing a $CH_3$ group, in the vapor phase in the presence of an oxygen-containing gas into contact with a catalyst comprising molybdenum and uranium.

2. The process which comprises passing an aromatic compound, containing a $CH_3$ group, in the vapor phase in the presence of an oxygen-containing gas into contact with a catalyst comprising oxides of molybdenum and uranium.

3. The process which comprises passing an aromatic compound, containing a $CH_3$ group, in the vapor phase in the presence of an oxygen-containing gas into contact with a catalyst comprising oxides of molybdenum and uranium in approximately the proportions of one to ten.

4. The process which comprises passing an aromatic compound, containing a $CH_3$ group, in the vapor phase in the presence of an oxygen-containing gas into contact with a catalyst comprising oxides of molybdenum, uranium and copper.

5. The process which comprises passing toluene in the vapor phase in the presence of an oxygen-containing gas into contact with a catalyst comprising oxides of molybdenum, uranium and copper.

6. The process which comprises passing toluene in the vapor phase in the presence of an oxygen-containing gas into contact with a catalyst comprising oxides of molybdenum and uranium in about the proportion of one to ten.

7. The process which comprises passing toluene in the vapor phase in the presence of an oxygen-containing gas into contact with a catalyst at a temperature between 300° C. and 700° C., said catalyst comprising an intimate mixture of the oxides of molybdenum and uranium.

8. The process which comprises passing toluene in the vapor phase in the presence of an oxygen-containing gas into contact with a catalyst at a temperature between 300° C. and 700° C., said catalyst comprising an intimate mixture of the oxides of molybdenum, uranium and copper.

9. The process which comprises passing an aromatic compound, containing a $CH_3$ group, in the vapor phase in the presence of an oxygen-containing gas into contact with a catalyst comprising a mixture of an oxide of at least two metals contained in the fifth and sixth groups of the periodic system and copper oxide.

10. The process which comprises passing toluene in the vapor phase in the presence of an oxygen-containing gas into contact with a catalyst comprising a mixture of an oxide of at least two metals contained in the fifth and sixth groups of the periodic system and copper oxide.

11. The process which comprises passing toluene in the vapor phase in the presence of an oxygen-containing gas into contact with a catalyst comprising oxides of molybdenum and uranium.

12. The process of producing benzaldehyde which comprises passing toluene in the vapor phase in the presence of an oxygen-containing gas into contact with a catalyst comprising the oxides of molybdenum and uranium, the oxide of uranium predominating.

13. The process of producing aromatic aldehyes which comprises passing an aromatic compound containing a methyl group in the vapor phase in the presence of an oxygen-containing gas into contact with a catalyst comprising the oxides of molybdenum and uranium, the oxide of uranium predominating.

14. The process which comprises passing an aromatic compound, containing a nuclear bound alkyl group, in the vapor phase in the presence of an oxygen-containing gas into contact with a catalyst comprising molybdenum and uranium.

15. The process which comprises passing a benzene hydrocarbon, containing an alkyl group attached to the benzene nucleus, in the vapor phase in the presence of an oxygen-containing gas into contact with a catalyst comprising molybdenum and uranium.

In testimony whereof I affix my signature.

AUGUSTUS E. CRAVER.